Aug. 24, 1926.

I. S. MERRELL

WATER SOLUBLE TEA PRODUCT

Filed Feb. 24, 1922  3 Sheets-Sheet 2

1,596,986

Aug. 24, 1926.
I. S. MERRELL
1,596,986
WATER SOLUBLE TEA PRODUCT
Filed Feb. 24, 1922     3 Sheets-Sheet 3
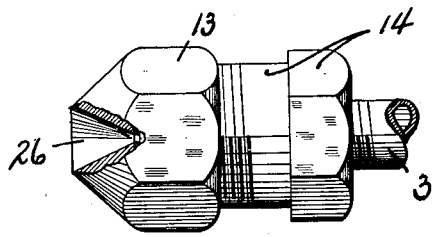
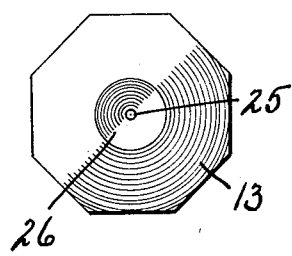
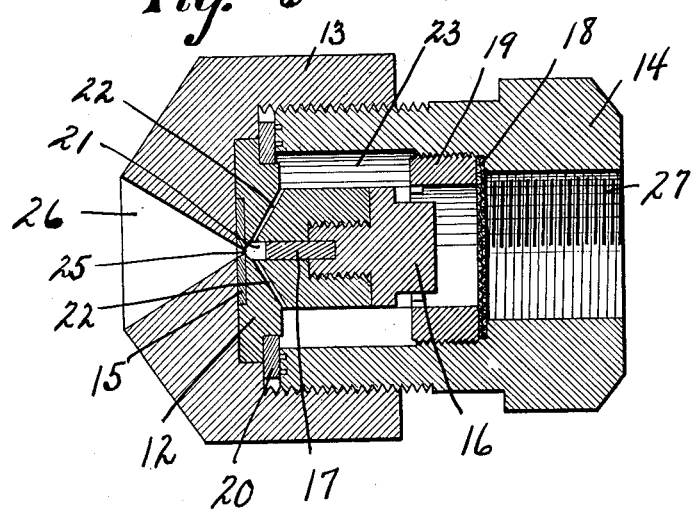

Patented Aug. 24, 1926.

1,596,986

UNITED STATES PATENT OFFICE.

IRVING S. MERRELL, OF SYRACUSE, NEW YORK, ASSIGNOR TO MERRELL-SOULE COMPANY, OF SYRACUSE, NEW YORK, A CORPORATION OF NEW YORK.

WATER-SOLUBLE TEA PRODUCT.

Application filed February 24, 1922. Serial No. 538,883.

This invention relates to a process for obtaining the solids and flavoring matters of an infusion of an herb in substantially dry form and the product of that process. The infusion of an herb, such as for instance, an infusion of tea, especially Brazilian tea, contains but a very small percentage of solids, perhaps one-half of one percent, an amount too infinitesimal to permit practical desiccation of such an infusion by the spraying process. Very often more than one-half percent of the solids of the solution to be dried by spraying the same into a current of moisture absorbing air is lost in the escaping air.

It is desirable to produce a substantially dry product which upon reconstitution with water, will make an infusion of an herb, such as an infusion of a tea, and I have discovered a process capable of effecting that result in a satisfactory manner and have produced a novel and desirable product. My invention will be understood from a description of its application to one particular infusion of an herb, as an infusion of tea the same being used as a specific illustration of its adaptability to other infusions of herbs. The infusion of an herb may be obtained in any desired or suitable manner, as by steeping any herb such as tea. The infusion so obtained is mixed or combined in any suitable manner with a body-forming material or desiccatable addenda which in combination with the solids and flavoring matter of the herb infusion constitute a commercially dryable and collectible substance which can be reduced to powdered form and in that form retained for future reconstitution with water. Such a desiccatable addenda or body forming material is a product produced by the hydrolysis of starch, preferably glucose or corn syrup of high dextrin content. Many other materials may be found suitable for the purpose. The one used as an illustration is a product considered preferable. The hydrolization of starch for the purpose of this process may be effected in any desired manner. I will specifically refer to two suitable methods. First, the dilute-acid method and second the diastase method.

Firse, when starch and water are heated with a dilute-acid the starch molecule is gradually and progressively split up into other carbo-hydrates the main products in substantially the order of their production being dextrine, maltose and dextrose.

The product comprising dextrine, maltose and dextrose is commonly known as glucose or corn syrup.

Second, as illustrative, sprouted barley contains an active principle called a diastase that will act on starch and convert it into dextrine, maltose and dextrose. Probably such products are progressively produced in a manner quite similar to their production by the acid treatment. The hydrolysis of starch, therefore, either as stated by heating the same in combination with a dilute acid or by the action of a diastase, will result in the production of dextrine, maltose and dextrose in various proportions, depending upon the extent to which the conversion has taken place. If the dilute-acid method be adopted and the process arrested as soon as a cooled sample of the liquid ceases to give a blue color with iodine, the product contains a large percentage of dextrine, but if high pressure be employed and the action pushed further, dextrose is the main product. It may be suggested that by boiling starch with dilute acid until the cool liquid ceases to give a blue color with iodine, we have substantially pure dextrine. By continuing the boiling process, dextrine yields maltose, and the further carrying of the process splits the maltose molecule into two parts of dextrose. These are products produced by the hydrolysis of starch.

The infusion of an herb produced in any suitable manner and mixed or combined with a product produced by the hydrolysis of starch to form a solution, is sprayed or atomized, as by forcing the same under high pressure through a minute orifice, and in this form is introduced into a current of heated or moisture-absorbing air. The liquid content is substantially completely and instantaneously vaporized and the product collects in the form of a fine, practically dry powder.

In the accompanying drawing, I have illustrated an apparatus adapted to carry out a preferred desiccating step involving the process herein.

Figure 4 is a side elevation of a suitable spray nozzle.

Figure 5 is an end elevation of the same.

Figure 6 is a longitudinal section of the same.

Figure 1:
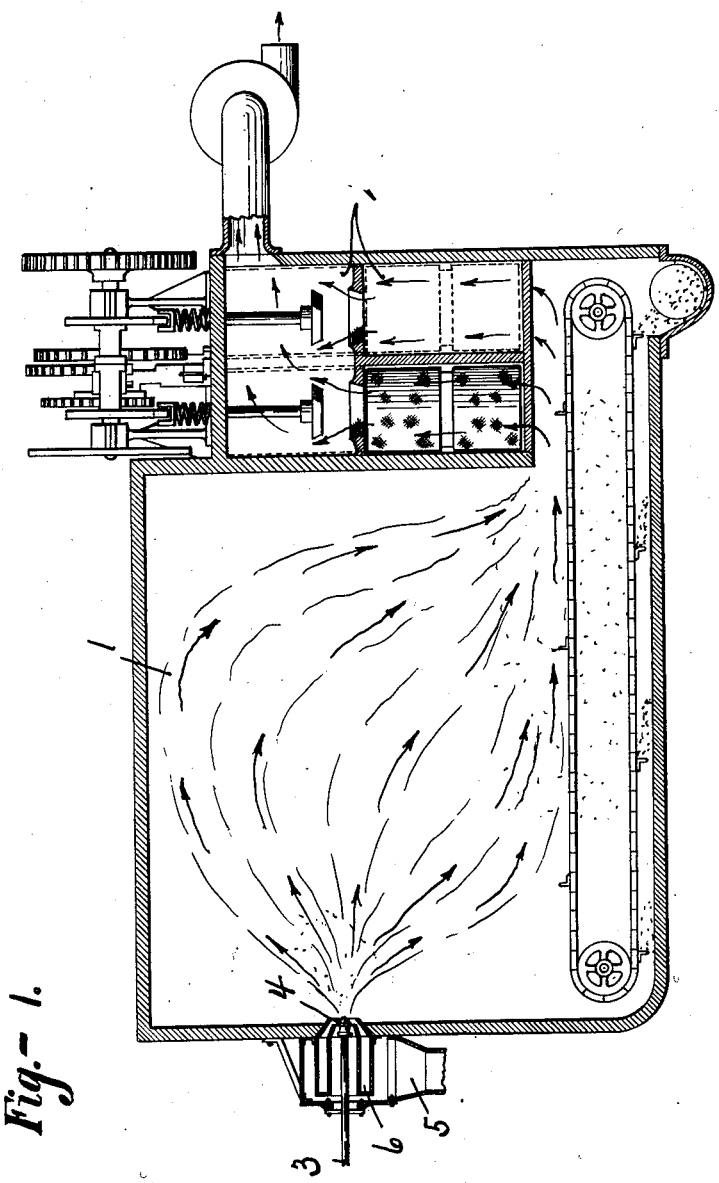
Figure 1 is a sectional view of such apparatus.
Figure 2:
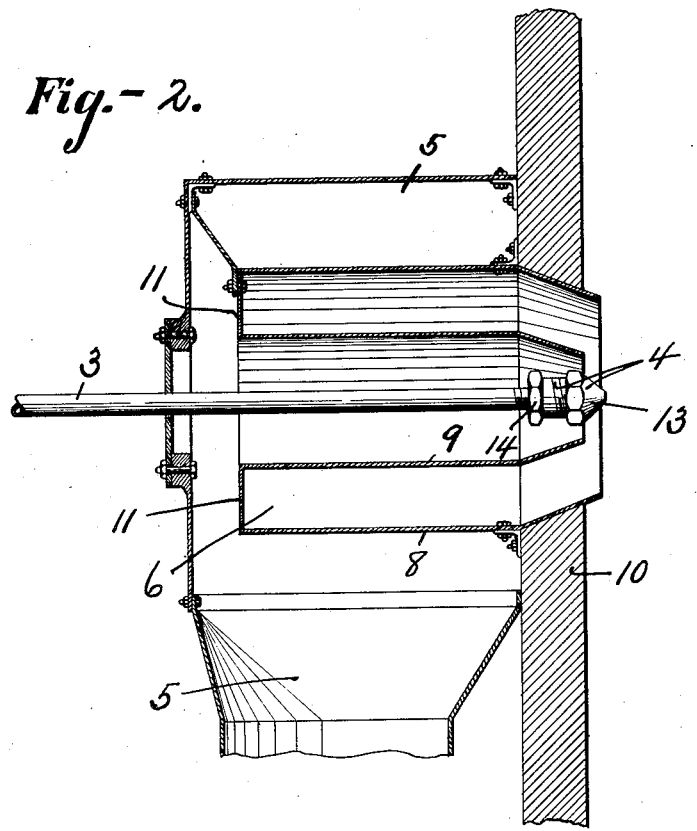
Figure 2 is an enlarged sectional view of the air introducing device.
Figure 3:
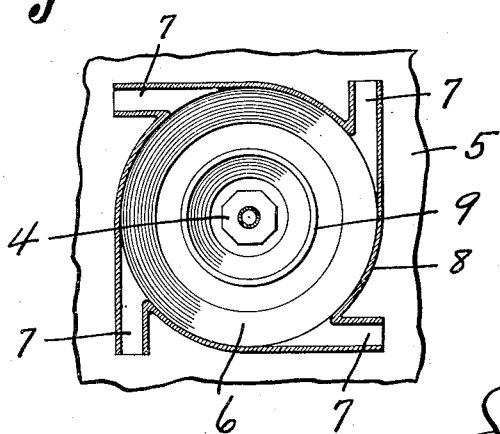
Figure 3 is a section of the air introducing device taken at right angles to Figure 2.

The general form of the desiccating chamber and collector disclosed is substantially the same as the structure shown in Letters-Patent No. 1,088,436, issued Feb. 24, 1919, to Merrell-Soule Company, as the assignor of I. S. Merrell, while the air-introducing devices are substantially the same as those disclosed in Letters-Patent No. 1,102,601 issued to Merrell-Soule Co. as the assignor of I. S. Merrell and O. E. Merrell, and the spray nozzle shown is substantially the same as that disclosed in Letters-Patent No. 1,183,393 issued to Merrell-Soule Co. as the assignor of I. S. Merrell and O. E. Merrell.

The desiccating devices comprise a desiccating chamber —1— of any suitable form and shape, having a suitable screened outlet or dust collector —2—, the construction of the latter being substantially the same as that shown in said Letters-Patent above referred to.

The mixture of an infusion of an herb and the product produced by the hydrolysis of starch is forced under high pressure thru a pipe —3— terminating in the spray nozzle —4— by means of which the solution is divided into infinitesimal particles. This atomized or sprayed solution is injected into a current of heated air introduced through the air conveying devices with the result that the liquid is instantaneously and practically completely vaporized, and the air and vapor escapes from the desiccating chamber, preferably thru suitable screening devices, while the practically dry powder gravitates to the floor of the chamber or is collected and separated from the air by the screening devices.

The air-introducing devices shown, comprise the wind trunk —5— thru which the heated air is forced by any suitable air blower or pump (not shown). This trunk communicates with an air whirling chamber —6— disposed intermediate the wind trunk and the desiccating chamber. This chamber —6— is preferably of substantially circular cross-section and receives heated air under pressure from the trunk —5— through a plurality of tangential inlet channels —7—. These channels are shown as four in number, equally spaced around the whirling chamber and of substantially equal conveying capacity. Each channel may extend the length of the cylindrical part —8— of the chamber —6—. The air forced from the trunk —5— through these tangential channels is set into rapid whirling motion by the cylindrical walls —8— and —9— of said chamber. The axis of the chamber —6— is preferably horizontal and at substantially right angles to one of the walls —10— of the desiccating chamber —1—. This air whirling chamber may be formed by a pair of substantially concentric walls —8— and —9— connected at their rear by transverse annular wall —11—, each of said concentric walls having its forward end tapered forwardly to form an annular constricted outlet communicating with the desiccating chamber, and preferably the taper of the wall —8— is somewhat greater than the taper of the wall —9— to further restrict the outlet, and decrease the pressure under which the air passes into the desiccating chamber.

The wall —9— may terminate a short distance at the rear of the termination of the wall —10— and as the wall —9— is open at its rear it constitutes a substantially cylindrical chamber through which the pipe —3— passes to the spray nozzle —4—, and preferably the forward end of the spray nozzle is just in front of the termination of the wall —8—. This cylindrical chamber formed within the wall —9— communicates at its rear with the trunk —5— and acts to convey a direct current of air surrounding and enveloping the spray as it is propelled through the spraying device, all surrounded and enveloped by the whirling current of air issuing thru chamber —6—. This construction is peculiarly efficient, both in effecting instantaneous and substantially complete vaporization of the liquid constituents of the solution, and in effecting an economy in space due perhaps to the rotary movement of the air and spray. The spraying device as shown in Fig. 6 comprises a body —12—, a cap —13—, a casing —14— secured to the cap by threaded engagement in such a manner as to confine the body —12— between the cap —13— and the casing —14—. Further, the nozzle comprises a spray disk —15—, a plug —16—, a plug pin —17—, a screen —18—, a screen supporting ring —19— and a washer —20—, all arranged in substantially the manner disclosed in the aforesaid patent so that the body —12— has a liquid whirling chamber —21— at the middle of its outer side to which the liquid is conveyed by two ducts —22— which communicate at their outer ends with the chamber —23— of the casing. The spray disk has a minute central orifice —25— communicating with the whirling chamber —21— and leading to the evase adjutage —26— formed in the cap —13—. The casing —14— is interiorly threaded at —27— to receive the liquid-conveying pipe —3— through which the liquid is forced under high pressure (as 2000 pounds to 3000 pounds to the square inch) by any suitable means as a pump (not shown).

The operation of this particular desiccating apparatus is substantially as follows. The air is introduced under pressure through the trunk —5— and forced into the desiccating chamber through the concentric chambers of the air introducing device in the manner heretofore described. The liquid is introduced into this current of heated air in atomized condition, and is carried spirally forward by the heated air and the liquid constituents are substantially completely vaporized.

A portion of the powder gravitates to the bottom of the desiccating chamber and the remaining portions carried by the air escape into the dust collecting or screening device —2— whereby the air and vapor are separated from the powder carried thereby, the air and vapor escaping while the powder is retained within the collecting device and in the use of this particular apparatus the powder is later deposited within the desiccating chamber and commingled with the powder primarily collecting therein.

In referring to the product of the spray process described herein as comprising or consisting of spherical particles, I mean to include particles constituting complete spheres or fragments thereof.

The expression "a product of hydrolyzed starch" and "a product obtained by the hydrolysis of starch" are deemed to include not only the immediate product such as glucose of varying contents of dextrin, dextrose and maltose, but also the derivatives or components of such products.

It will be obvious that various forms of desiccating apparatus may be utilized for the purpose of reducing the solution of a product of hydrolyzed starch and an infusion of an herb to a substantially dry powdered form. The resultant dry powder comprises a product of hydrolyzed starch and the solids and flavoring matters of the infusion of an herb in the form of substantially dry spherical particles. The relative amount of the infusion of an herb and the product of hydrolized starch constituting the solution to be sprayed may vary widely in accordance with the particular use to which the product is to be put, and the particular desires of the user, and altho I have shown and described a specific process as constituting a perhaps preferred embodiment of that aspect of my invention, and a particular product as being the result of that process, I do not desire to limit myself to the details of the product nor to any particular process of desiccation for producing that product, except as the same may be specifically included in the claims hereto appended.

I claim:

1. A solid, water-soluble tea product having the cup characteristics of the tea used in the preparation of the infusion, composed of water-soluble extractives of tea.

2. A solid, water-soluble tea product having the cup characteristics of the tea used in the preparation of the infusion, composed of the solid water-soluble extractives of tea leaves and the volatile extractives to give the original aroma and flavor.

3. A solid, water-soluble tea product having the cup characteristics of the tea used in the preparation of the infusion, composed of water-soluble extractives of tea and suitable carbohydrates.

4. A non-hygroscopic, solid, water-soluble tea product having the cup characteristics of the tea used in the preparation of the infusion, composed of water-soluble extractives of tea and suitable carbohydrates.

5. A solid water-soluble tea product having the cup characteristics of the tea used in the preparation of the infusion composed of water-soluble extractives of tea, and a substance obtained by the hydrolysis of starch.

6. A solid water-soluble tea product having the cup characteristics of the tea used in the preparation of the infusion composed of water-soluble extractives of tea and glucose.

In witness whereof I have hereunto set my hand this 18th day of February 1921.

IRVING S. MERRELL.